Jan. 26, 1965    P. E. L. FRODE    3,167,272
AUTOMATICALLY VARIABLE DRIVE GEARING FOR A FISHING REEL
Filed Sept. 11, 1961    2 Sheets-Sheet 1

INVENTOR.
PER ENAR LENNART FRODE
BY

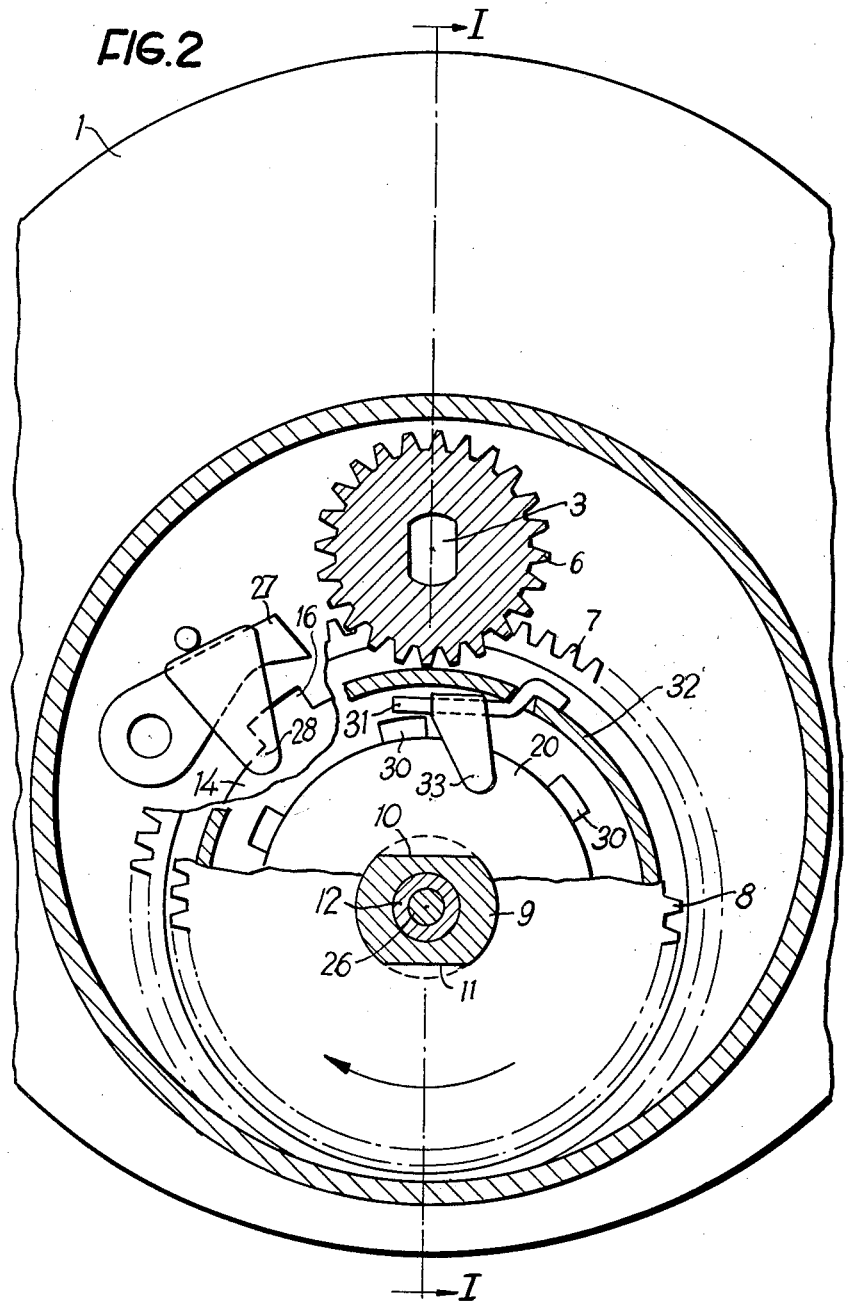

United States Patent Office 3,167,272
Patented Jan. 26, 1965

3,167,272
AUTOMATICALLY VARIABLE DRIVE GEARING FOR A FISHING REEL
Per Einar Lennart Frode, Svangsta, Sweden, assignor to AB Urfabriken, Svangsta, Sweden, a Swedish corporation
Filed Sept. 11, 1961, Ser. No. 137,109
Claims priority, application Sweden, Sept. 30, 1960, 9,364/60
11 Claims. (Cl. 242—84.54)

This invention relates to an automatically variable drive gear for fishing reels, in other words a device for automatically changing the speed ratio between the driving shaft and the line spool in a fishing reel of the kind in which a driving shaft is provided with a crank and retained against rotation in a sense opposite to the sense of rotation of the shaft for winding in the line on the spool and in which the driving shaft is connected by a friction coupling to a gear mechanism for driving the line spool with higher speed than that of the driving shaft.

Devices for changing the speed ratio between the driving shaft and the spool have been previously suggested, which comprise two driving gears of different diameters mounted on the driving shaft and meshing each with one of two driven pinions mounted on the shaft of the spool. The larger driving gears are optionally connectible with the driven part of the friction coupling, the driving part of which is coupled to the driving shaft.

It is a purpose of the invention to obtain a device, in which the changing of the gear ratio no longer needs be effectuated manually but is automatically determined and set according to the resistance opposed by the line against its winding on the spool depending on the stoutness and the behaviour of the fish.

In order to obtain this purpose both driving gears are rotatably mounted on the shaft and frictionally engaged therewith with a maximum limit sliding torque or largest possible torque of transmission, which is of a less order of magnitude than the sliding torque of the friction coupling and that the driven part of the friction coupling is connected with the smaller driving gear by a catch preventing the rotation of the smaller driving gear relative to the driven part of the friction coupling in a sense opposite to the sense of rotation of the driving shaft or to the sense of rotation of the driving part of the friction coupling upon winding in the line on the spool.

Thereby another purpose of the invention is attained to permit a such location of the cooperation parts of a sound producing device of known type, that no sounds are given when the line is wound in with the higher gear ratio and that sound signals are given with different frequencies when the line is wound in with the lower gear ratio and when the crank is rotated and the spool is stopped respectively or when the line is drawn off against the sliding torque of the friction coupling.

As an example of the device according to the invention an embodiment thereof is illustrated in the accompanying drawings.

FIG. 2 shows a cross section mainly along line II—II in FIG. 1 and with certain parts broken away to show underlying parts.

Figure 1:
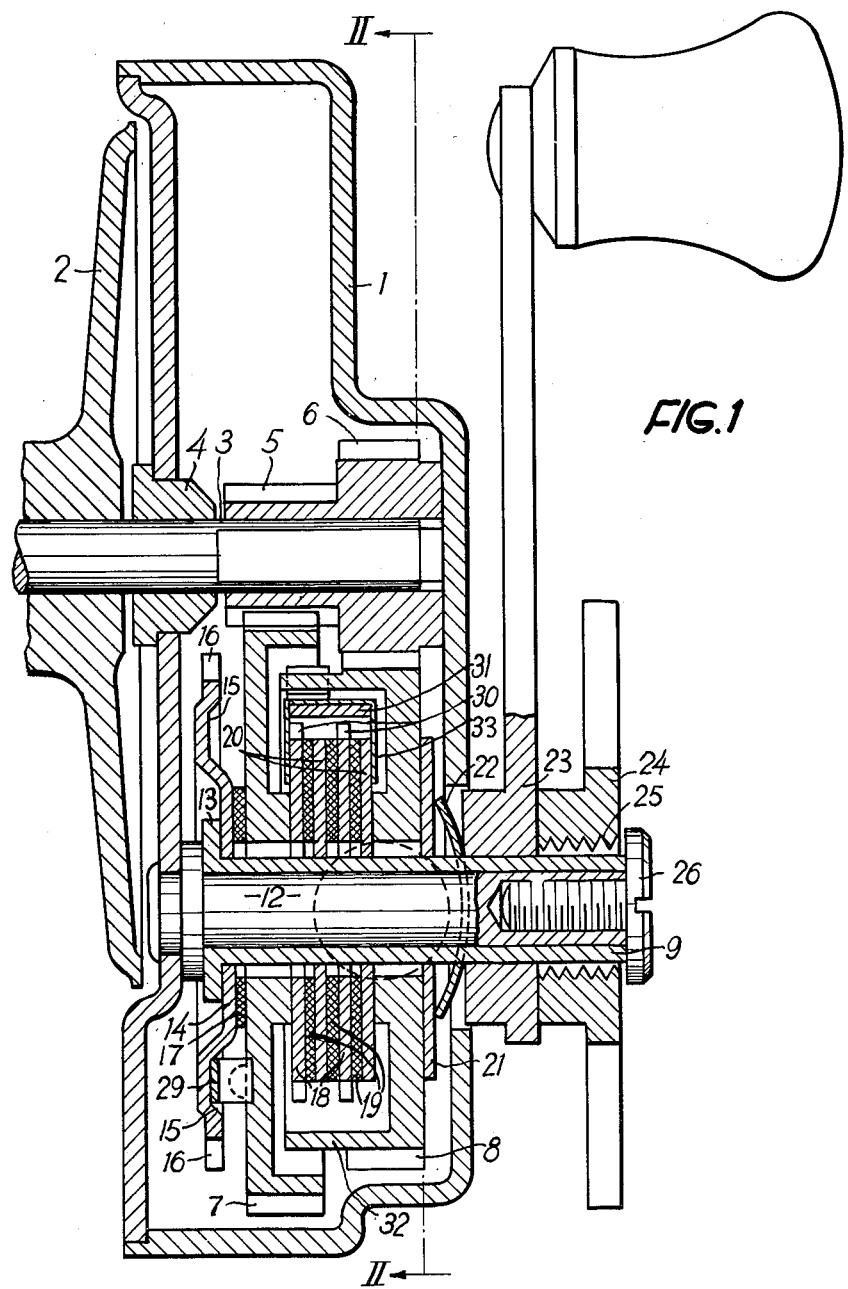
FIG. 1 is a section along the plane through the driving shaft and the spool shaft, essentially along line I—I in FIG. 2, showing the drive gear of a fishing reel according to the invention.

The driving mechanism is supposed to be mounted within a housing 1 forming one end flange of the reel. The spool shaft 3 is rotatably mounted in the housing at 4. On the spool shaft 3 two driven pinions 5, 6 of different diameters are mounted for rotation with the shaft 3. In the embodiment shown these two driven pinions are formed as a single member with two cogged peripheral portions. The smaller 5 of the driven pinions meshes with a larger, driving gear 7 and the larger of the driven pinions 6 meshes with a smaller driving gear 8. The differences of diameter between the driving gears 7 and 8 is equal to the difference in diameter between the driven pinions 5 and 6.

Both driving gears 7 and 8 are mounted coaxially on the driving shaft 9, which is hollow and has two diametrally opposed flats 10 and 11 (FIG. 2). The hollow shaft 9 is mounted on a pin 12 fixed into the housing, the pin 12 and the shaft 9 extending through a wall of the housing 1 to its outside. At its inner end the shaft 9 has an outward supporting end flange 13. Counted from this end flange 13, following parts are in succession slipped over the shaft 9: viz. a catch disc 14, a friction pad 17, the larger driving gear 7, a driven friction disc 18, a friction pad 19, a driving friction disc 20, a second friction pad 19, a second driven friction disc 18, a third friction pad 19, a second driving friction disc 20, the smaller of the driving gears 8, a friction disc 21, a bent, annular leaf spring 22, the crank 23 and a star wheel 24 of a type known per se for adjusting the friction braking of the spool. Of these parts the following are axially slidable but unrotatably mounted on the shaft 9 by a central opening shaped according to the flattened outer cross-sectional form of the shaft, viz: the catch disc 14, both driving friction discs 20 the friction disc 21 and the crank 23. The following parts are both slidably and rotatably mounted in the shaft with circular holes surrounding the cylindrical portions of the outer surface of the shaft 9, viz: the driving gears 7 and 8, the friction pad 17, both driven friction discs 18, the three adjacent friction pads 19 and the annular bent leaf spring 22. The outer end of the hollow shaft 9 has an outer screw threading 25 on the cylindrical portions of its outer surface said threading 25 being engaged by a correspondingly threaded bore in a hub portion of the star wheel 24. In the outer free end of the pin 12 there is a threaded axial bore for a screw 26, the head of which has a somewhat larger diameter than the shaft 9 and serves as an abutment preventing an unintended screwing off of the star wheel 24.

A catch 27 pivotally mounted in the housing outside the periphery of the catch disc 14 has two leaf spring arms 28 in light frictional engagement each with a side face of the catch disc 14, and a nose portion adapted for engagement in a manner known per se with projections 16 on the outer periphery of the catch disc 14 so as to prevent the rotation of the catch disc and thereby of the driving shaft 9 in a sense opposite to the sense of rotation for winding in the line, which winding sense is indicated with an arrow in FIG. 2. The catch disc 14 has further a number of recesses 15 in the face thereof turned towards the larger driving pinion 7. Said recesses form together with a spring 29 fixed onto the larger driving pinion 7 a sound signals producing device, giving one sound signal each time the spring 29 snaps into a recess 15.

The driven friction discs 18 in the disc pack 18, 19, 20 forming the friction coupling have projections 30 on their outer periphery. These are adapted to cooperate with a pawl member 31 pivotally mounted in an opening in a cylindrical flange 32 projecting from the smaller driving pinion 8 and surrounding the friction coupling 18, 19, 20. This pawl member 31 has two leaf spring arms 33 extending on either side of the outmost discs 18 and 20 in the disc pack and engaging said outer sides with slight friction, whereby the pawl member 31 is held out of the path of motion of the projections 30 when the smaller driving pinion 8 is rotated in the clockwise sense relative to the disc pack, but is swung into engagement with said projections 30 when the driving pinion 8 is rotated in the opposite sense relative to the disc pack.

When used, the device above described works as follows:

The pressure, with which the parts 14–23 slipped on the shaft 9 are pressed against each other is the same for each pair of adjacent members and is determined by the tension of the bent leaf spring 22, which tension can be adjusted by screwing the star wheel 24 on the shaft 9. The sliding torque between the driving shaft 9 and each of the driving gears 7 and 8 is of the same order of magnitude, preferably slightly larger for the larger driving gear 7.

When the pull in the line resisting the winding up of the line of the spool is less than what corresponds to the sliding torque between the larger driving gear 7 and the shaft 9, the torque exerted by the crank 23 on the shaft 9 is transmitted by the larger driving gear 7 to the catch disc 14 and the disc pack of the friction coupling 18–20. The larger driving gear 7 drives the spool 2 through the small driven pinion 5 with the higher speed ratio determined thereby. The larger driven pinion 6 then drives the smaller driving gear 8 with higher speed than that of the larger driving gear 7 and in the same sense or direction as the latter. Because of the gear ratio between the driving gears 7 and 8 through the driven pinions 5 and 6 the sliding torque between the smaller driving gear 8 and the adjacent discs 20 and 21 which are coupled with the shaft 9, is surmounted. The smaller driving gear 8 is rotated in the clockwise sense (as seen in FIG. 2) relative to the larger driving gear 7 and the disc pack, so that the pawl 31 is swung in the clockwise sense relative to the pack and is kept in the free position illustrated in FIG. 2.

When the pull resistance in the line increases to a value, surmounting the sliding torque between the gears 7, 8 and the shaft 9, or more particularly the sliding torque between catch disc 14 and driving gear 7—then the drive torque from the shaft 9 is transmitted to the driving discs 20 of the disc pack which are coupled to the driving shaft, the disc pack being thereby rotated in the clockwise sense relative to the smaller driving gear 8. This relative rotation is arrested by the pawl 31, which is swung into the path of motion of the projections 30 on the discs 18 not coupled to the shaft 9 and which thereby engages one of said projections. The smaller driving gear 8 is thereby forced to rotate together with the driven friction discs 18. The driven friction discs 18 are in their turn driven with the sliding torque of the friction coupling i.e. the torque produced by the frictional engagement between the discs 20 and 18 in the disc pack, which torque is much greater than the sliding torque between the shaft 9 and the driving gears 7 and 8. The spool is then driven through the disc pack, the smaller driving gear 8 and the larger driven pinion 6, which determine the lower gear ratio. The relative rotary motion thereby produced between for one part the shaft 9 and the catch disc 14 and for the other part the larger driving gear 7 results in sound signals being transmitted by the sound signal mechanism 15, 29 each time the spring 29 snaps into recesses 15 in the catch disc 14.

When the pull resistance in the line increases further to a sufficient extent, even the sliding torque of the disc pack 18–20 is finally surmounted. The spool 2 and thereby both driving gears 7 and 8 are stopped and the relative speed between the larger driving gear 7 and the catch discs 14 increases, whereby even the periodicity of the sound signals is increased. It is therefore possible to judge from the frequency of the sound signals whether the line is wound in with the higher gear ratio (no signals) or with the lower gear ration (low signal frequency) or if the line is not wound in at all (higher signal frequency). The last case is also to be recognized from the fact, that the resistance against turning the crank is greater.

The cooperation of the catch or pawl 27 with the catch disc 14 prevents the shaft 9 and the members 20, 21 and 23 coupled thereto from rotating backwards when the line is drawn off against the sliding torque of the friction coupling or disc pack 18–20. Even then sound signals are transmitted because of the rotation of the larger driving gear 7 relative to the blocked catch disc 14.

The invention is not limited to the embodiment described above and illustrated in the drawings. The different parts can be arranged in another relation than shown. Especially the order, in which the elements mounted on the driving shaft are disposed can be changed without changing the result of the above described function forming a purpose of the invention. Still further modifications are possible within the scope of the invention as claimed in the appending claims.

What I claim is:

1. An automatically variable transmission drive suitable for a fishing reel comprising a driving shaft, and a driven shaft, two driving gears of different diameters rotatably mounted on the driving shaft, two driven pinions secured on the driven shaft meshing each with one of said driving gears and having corresponding different diameters, a friction coupling having a driving part in positive driving connection with the driving shaft and a driven part having a one-way driving connection with the smaller driving gear in the same sense of rotation of the driving shaft and of the driving part of the friction coupling during the winding of line on a spool, a friction member secured to the driving shaft and in frictional engagement with the larger driving gear, the maximum sliding torque of said friction member being of a lower order than said friction coupling.

2. A device as claimed in claim 1, in which sound producing means are secured to said driving shaft, and complementary means are secured to the larger driving gear to produce discernably different sound signals at different relative speeds between said driving gear and said driving shaft.

3. An automatically variable transmission drive comprising a driven shaft in driving connection with a line spool in a fishing reel, a drive shaft, catch means mounted on said drive shaft, a pawl engaging said catch means to prevent rotation of said shaft in a sense contrary to the sense of winding the line on the spool, two driving gears of different diameters rotatably mounted on the driving shaft, two driven pinions on the driven shaft meshing each with one of said driving gears and having corresponding different diameters, a friction coupling formed of a number of friction discs alternatedly non-rotatable and rotatable on the driving shaft and forming the driving part and the driven part respectively of the friction coupling, the rotatable friction discs of the driven part of the coupling having means drivingly engaging the smaller of the driving gears in the same sense only to that in which the driving shaft and the driving part of the friction coupling are rotated for winding the line on the spool, friction discs non-rotatably mounted on the driving shaft frictionally engaging the other of the driving gear with a maximum transmissible torque of lower order than the maximum torque transmissible by the friction coupling.

4. An automatically variable drive transmission comprising a driving shaft and a driven shaft in driving connection with a line spool in a fishing reel, engageable means on said driving shaft, stationary panel means engaging said means on the driving shaft to prevent rotation thereof in a sense contrary to the sense of winding a line on the spool, two driving gears of different diameters rotatably mounted on the driving shaft, two driven pinions mounted on the driven shaft meshing each with one of said driving gears and having corresponding different diameters, a friction coupling having a driving part in positive driving connection with the driving shaft and a driven part, a ratchet mechanism drivingly connecting said driven part to the smaller driving gear in a sense the same as the sense in which the driving shaft is rotated during the winding of line on the spool, friction discs non-rotatably mounted on the shaft and frictionally connected each with one of the driving gears with a maximum transmissible torque of lower order than the maximum torque transmissible by the friction coupling, at least one of the friction discs having a peripheral part provided with recesses or openings and the larger driving gear having fixed thereon a resilient member adapted upon relative rotation of said driving gear and of said friction disc to snap into said recesses or openings to produce sound signals.

5. An automatically variable drive gearing between a driving shaft and a driven shaft in driving connection with the line spool in a fishing reel, two driving gears of different diameters rotatable relative to the driving shaft, two driven pinions on the driven shaft meshing each with one of said driving gears and having correspondingly different diameters, a friction coupling having a driving part and a driven part, said driving part in positive driving connection with the driving shaft, a pawl mechanism drivingly connecting said driven part to the smaller of said driving gears in a sense the same as the rotation of the driving shaft during the winding of line on the spool, a friction disc non-rotatably mounted on the shaft and frictionally engaging the larger of the driving gears with a maximum transmissible torque of lower order than the maximum torque transmissible by friction coupling.

6. A device substantially as set forth in claim 3 and further characterized in that said means drivingly engaging the smaller of the driving gears comprises a pawl and ratchet mechanism.

7. The device set forth in claim 6 and further characterized by a sound producing device positioned between one of non-rotatably mounted friction discs driving a larger of said driving gears and said larger gear to produce a sound upon slippage of said friction drive thereof.

8. The device set forth in claim 6 and further characterized by a sound producing device constructed and arranged between the larger of said driving gears and said driving shaft to produce sound upon relative rotary motion therebetween.

9. An automatic variable drive comprising a drive shaft, a driven shaft, a pair of pinions drivingly mounted on said driven shaft, a pair of gears rotatably mounted on said drive shaft, the first of said pair of gears drivingly engaging one of said pair of pinions, in a high gear ratio, the other of said pair of gears drivingly engaging the other of said pinions in a relatively lower gear ratio, a frictional member drivingly secured to said shaft and frictionally engaging said other gear of said lower drive ratio, a second frictional member drivingly secured on said drive shaft and frictionally engaging said first gear of higher drive ratio, said second named frictional member having a higher sliding torque engagement with said higher ratio gear than said first named frictional member has with said lower ratio gear, a friction pack having a friction part drivingly secured on said drive shaft and a friction part rotatably mounted on said driving shaft, said last named friction part having a driving ratchet connection with said gear of lower ratio whereby rotation of said drive shaft frictionally drives said gear of higher ratio to thereby drive said driven shaft at a high speed, said driven shaft, in turn, driving said gear of lower ratio at a higher speed in the same sense as said drive shaft when the torque resistance to said driving shaft is of a predetermined low order and when said torque resistance exceeds said predetermined low order, said first gear frictional member slips and said ratchet connection of said friction pack drives said driven shaft through said gear of lower ratio.

10. An automatic variable drive suitable for a fishing reel comprising a shaft having at least two gears rotatably mounted thereon, the first of said gears being part of a gear train of a first transmission ratio, the second of said gears being part of a gear train of a second relatively lower transmission ratio, frictional driving means of a predetermined sliding torque between said first gear and said shaft, a member mounted on said shaft in one way driving connection with said second gear, a friction drive means of sliding torque greater than said predetermined sliding torque frictionally connecting said shaft to said member whereby said gear of lower ratio rotates with said shaft when said predetermined sliding torque is exceeded, mechanism secured to said shaft and engaging means driven by said first gear to produce sound in relative rotary movement between said gear and said shaft.

11. An automatic variable drive suitable for a fishing reel comprising a shaft having at least two gears rotatably mounted thereon, the first of said gears being part of a gear train of a first transmission ratio, the second of said gears being part of a gear train of a second relatively lower transmission ratio, frictional driving means of a predetermined sliding torque between said first gear and said shaft, a member mounted on said shaft in one way driving connection with said second gear, a friction drive means of sliding torque greater than said predetermined sliding torque frictionally connecting said shaft to said member whereby said gear of lower ratio rotates with said shaft when said predetermined sliding torque is exceeded and a single resilient means mounted about said shaft axially urging said gear, said friction drive means and said friction coupling toward each other.

References Cited in the file of this patent

UNITED STATES PATENTS

| | | |
|---|---|---|
| 1,542,403 | Miles | June 16, 1925 |
| 1,991,407 | Miller et al. | Feb. 19, 1935 |
| 2,167,846 | Martin | Aug. 1, 1939 |
| 2,240,075 | Kovalovsky et al. | Apr. 29, 1941 |
| 2,417,732 | Bland et al. | Mar. 18, 1947 |

FOREIGN PATENTS

| | | |
|---|---|---|
| 706,208 | Great Britain | Mar. 24, 1954 |